US012083703B2

(12) United States Patent
Engnell

(10) Patent No.: US 12,083,703 B2
(45) Date of Patent: Sep. 10, 2024

(54) WOOD CHIPPER KNIFE

(71) Applicant: Andritz AB, Örnsköldsvik (SE)

(72) Inventor: Mats Engnell, Iggesund (SE)

(73) Assignee: Andritz AB, Ornskoldsvik (SE)

( * ) Notice: Subject to any disclaimer, the term of this patent is extended or adjusted under 35 U.S.C. 154(b) by 424 days.

(21) Appl. No.: 17/278,162

(22) PCT Filed: Jan. 14, 2020

(86) PCT No.: PCT/SE2020/050032
§ 371 (c)(1),
(2) Date: Mar. 19, 2021

(87) PCT Pub. No.: WO2020/149781
PCT Pub. Date: Jul. 23, 2020

(65) Prior Publication Data

US 2021/0347085 A1 Nov. 11, 2021

(30) Foreign Application Priority Data

Jan. 14, 2019 (SE) .................................... 1950034-7

(51) Int. Cl.
*B27L 11/00* (2006.01)
*B02C 18/18* (2006.01)
*B27G 13/04* (2006.01)

(52) U.S. Cl.
CPC ............ *B27L 11/005* (2013.01); *B02C 18/18* (2013.01)

(58) Field of Classification Search
CPC ....... B27L 11/005; B02C 18/18; B27G 13/02; B27G 13/04; B27G 13/08; B27G 13/10
See application file for complete search history.

(56) References Cited

U.S. PATENT DOCUMENTS 5,979,522 A 11/1999 Swartwood et al.
7,140,408 B1 11/2006 Hinchliff et al.
(Continued)

FOREIGN PATENT DOCUMENTS

CA 3020888 A1 * 10/2017 ............ B27G 13/04
DE 93 03 186 U1 5/1993
(Continued)

OTHER PUBLICATIONS

Supplementary European Search Report dated Sep. 14, 2022, in European Patent Application No. 20741490.5.
(Continued)

*Primary Examiner* — Mohammed S. Alawadi
(74) *Attorney, Agent, or Firm* — Venable LLP

(57) ABSTRACT

A wood chipper knife includes a knife body and, in relation to a vertical axis of the wood chipper knife, at least one cutter side, which comprises a top cutting edge portion and a bottom cutting edge portion that intersect to form a cutting edge. The bottom cutting edge portion includes a planar wood attacking portion, which begins at the cutting edge and towards the knife body is followed by a recess. The recess is a pressure release recess, which, from the wood attacking portion, abruptly falls to a bottom of the pressure release recess, and which stretches from the wood attacking portion to the knife body. The knife body comprises a chip guiding portion, which, from the pressure release recess, rises towards the knife body.

20 Claims, 2 Drawing Sheets

(56) References Cited

U.S. PATENT DOCUMENTS

| | | | | |
|---|---|---|---|---|
| 2003/0015254 | A1* | 1/2003 | Hinchliff | B27L 11/005 144/241 |
| 2008/0115858 | A1 | 5/2008 | Stager | |
| 2008/0166189 | A1 | 7/2008 | Stager | |
| 2009/0025829 | A1* | 1/2009 | Hinchliff | B27L 11/005 144/241 |
| 2019/0084180 | A1 | 3/2019 | Carpenter | |

FOREIGN PATENT DOCUMENTS

| | | | |
|---|---|---|---|
| WO | 02/06022 | A1 | 1/2002 |
| WO | 2017/177345 | A1 | 10/2017 |
| WO | 2020/149781 | A1 | 7/2020 |

OTHER PUBLICATIONS

International Search Report dated Mar. 3, 2020, in International Application No. PCT/SE2020/050032.

* cited by examiner

WOOD CHIPPER KNIFE

TECHNICAL FIELD

The present invention concerns a wood chipper knife comprising a knife body and, in relation to a vertical axis (or plane of symmetry) of the wood chipper knife, at least one cutter side, which comprises a top cutting edge portion and a bottom cutting edge portion that intersect at an acute angle to form a cutting edge, wherein the bottom cutting edge portion comprises a planar wood attacking portion, which begins at the cutting edge and towards the knife body is followed by a recess.

BACKGROUND

Wood chipper knives are used in chippers to process logs into wood chips. The wood chips are produced from many different wood species, which have different density, moisture content, fiber length and other specific characteristics, such as resinous or frozen, and are used for further processing.

In order for wood chipper knives to work properly and to provide well separated wood chips of an even size, which is important for further processing, they have to be shaped in a way that fits a log to be cut down to wood chips in the best way possible. However, typical for the industry today is that the knives used have the same basic form independent of what wood to chip and process, which can result in an increased amount of chips which cannot be used for further processing due to wrong sizes (too small, i.e. particulate, or oversized). The basic form typically comprises non-interrupted, flat surfaces which form knife edges.

It is also known in the art to use mechanical arrangements separate from and downstream of wood chipper knives to break up chips further. However, such arrangements are expensive and tend to increase the amount of small particles, which cannot be used for further processing and therefore have to be scrapped.

Further, wood chipper knives may be formed as rotatable wear inserts, which have a first cutting edge and an opposite second cutting edge and which are mounted in disc, drum or conical head chippers in an easy, replaceable way. On the head of such a chipper, a wood chipper knife is typically clamped such that it can be rotated 180° to allow use of the second cutting edge once the first cutting edge is worn out.

U.S. Pat. No. 8,033,308 B2 describes a known wood chipper knife. The recess of this known wood chipper knife serves together with canted surfaces to smoothly guide cut chips to a deflector ridge, which holds chips off a wear insert of a knife holder. By this, life of the wear insert and the knife holder is prolonged compared with wood chipper knives that lack such a deflector ridge arrangement.

OBJECT OF THE INVENTION

Although the known wood chipper knife constitutes an improvement over some other previously known wood chipper knives, in practice it shows that chipper knives of this kind can run into trouble when one tries to cut wood that does not release chips easily, that is, when chips tend to adhere to each other and form so-called cards because their wood fibers are not totally separated from each other. The trouble that arises then is that there is both a tendency toward clogging of the chipping machinery and toward poor quality of the chips produced, which is detrimental both from a production point of view as well as from an environmental point of view.

Against that background, it is an object of the present invention to improve a wood chipper knife such that clogging tendency is reduced and chip quality is improved.

BRIEF SUMMARY OF THE INVENTION

Said object of the invention is achieved by means of a wood chipper knife comprising the features mentioned in the preamble and the further features that the recess is a pressure release recess, which, from the wood attacking portion, abruptly falls to a bottom of the pressure release recess, and that at the knife body comprises a chip guiding portion, which, from the pressure release recess, rises towards the knife body.

According to the invention, the wood attacking portion of the wood chipper knife is planar and has a length within limits that the skilled person chooses depending on the case at hand to achieve an even chip size and good chip separation, in conjunction with a second feature of the present invention. This feature is the pressure release recess that follows the wood attacking portion and is abruptly recessed in relation thereto. In this context, the term abruptly is used to describe a form of recess that does not smoothly or gently evolve from a knife-edge-joining portion, as is the case in the cited prior art solution, but to define a recess that by a sudden sharp transition, so to speak, pulls the rug from under the feet of cut chips, which are still under pressure from the planar wood attacking portion and thus are exposed to a sudden pressure release. By this, wood fibers of adjacent chips, which are not yet separated sufficiently well from each other, tend to break up and thus to totally free the chips from each other. Again, superior results, that is, optimum chip separation in given circumstances, are achieved within limits of depth and width of the pressure release recess which the skilled person is able to determine. Further, thanks to the above features, it is according to the invention rendered possible to better control chip dimensions, especially chip thickness, and thus to achieve more consistent results. Finally, in order to avoid clogging and to prolong the life of a knife holder that holds the wood chipper knife, the knife body comprises a chip guiding portion arranged to hold chips off the knife holder. This is done best if the pressure release recess rises towards the knife body in relation to said vertical axis within a certain angular range.

Typically, the bottom of the pressure release recess is placed at a depth of at least 0.3 mm. However, a depth of at least 0.5 mm or at least 0.8 mm can, in certain circumstances, prove to be advantageous as well. In a majority of the currently preferred solutions, the bottom of the pressure release recess is placed within a depth range of 0.5-2 mm, or more preferably of 0.8-1.2 mm, or, which as presently most preferred, at a depth of about 1 mm. Depths within these limits have proven to suffice in most cases to provide a sufficiently high pressure release to break cards apart into separate chips.

Typically, the pressure release recess from the wood attacking portion to the knife body has a width of 2.8-8 mm. However, preferably the width amounts to 3-7 mm. And currently most preferred is a width of about 6 mm. Widths within these limits have proven to prevent clogging and to reliably guide separated chips away from the chipping area.

According to one embodiment, the pressure release recess of the wood chipper knife according to the invention comprises a first transition portion, which, from the bottom of the pressure release recess, rises towards the wood attacking portion along a concave curve with a radius of 0.1-1.5 mm. However, more preferably the radius amounts to 0.5-1.2 mm, or to 0.7-1.1 mm, or to 0.6-1.0 mm. And the most preferred radius is currently 0.8 mm. It has turned out that a concave curve within these limits optimizes chip separation and provides positive transfer of separated chips towards the chip guiding portion.

According to some embodiments, the first transition portion does, towards the wood attacking portion, tangentially transform into a straight portion. That is, the first transition portion includes a straight portion adjacent the wood attacking portion, and that straight portion transitions into a tangent of the concave curve. By this, the pressure release recess is provided with a very sharp and thus extremely abrupt start at the end of the wood attacking portion.

Preferably, the pressure release recess of the wood chipper knife according to the invention comprises a second transition portion, which, from the bottom of the pressure release recess, rises towards the knife body along a concave curve with a radius of 0.4-7 mm, or of 0.5-5 mm, or of 1-4 mm. However, more preferably the radius amounts to 2-3 mm. And currently, most preferred is a radius of about 2.5 mm. A transition within these limits has shown to guide separated chips in a well-controlled way onto the chip guiding portion and thus to minimize clogging tendencies.

A further way to minimize such clogging tendencies is too have the second transition portion of the pressure release recess tangentially transform into the chip guiding portion of the knife body. By this the separated chips follow a natural path onto the chip guiding portion and do therefore not tend to tumble into disorder and to cause clogging.

Typically, said chip guiding portion is inclined towards the knife body at an angle in relation to said vertical axis of 10° to 50°, or of 15° to 48°, or of 25° to 47°. However, a majority of preferred solutions comprise angles of 30° to 40°. And a currently most preferred solution comprises an angle of about 35°. Angles within these limits have proven to effectively guide separated chips away from the chipping area and to hold them off knife mounting means.

Typically, the planar wood attacking portion from the cutting edge to the recess has a width of 5-10 mm. However, at present a width of 7-8 mm is more preferred. And a width of about 7.55 mm is currently the most preferred. Widths within these limits have proven to provide chips of sizes well suited for further processing.

Preferably, the wood attacking portion of the wood chipper knife according to the invention forms in relation to said vertical axis an angle of 83° to 89°. However, more preferred is at present an angle of 85° to 87°. And an angle of about 86° is currently most preferred. Angles within these limits have proven to provide optimum cutting results and an optimum chip separation in conjunction with the pressure release recess.

Further, in the wood chipper knife according to the invention, the bottom of the pressure release recess is preferably planar and does, in relation to said vertical axis, preferably form an angle of 70° to 93°. However, more preferred is at present an angle of 89° to 91°. And an angle of about 90° is currently most preferred. A bottom inclined within these angular limits can help to improve transfer of separated chips in a non-tumbling way to the chip guiding portion and thus to further minimize clogging risks.

Finally, the acute angle of the cutting edge typically amounts to 30° to 40° However, more preferred is at present an angle of 33° to 37°. And an angle of about 35° is currently most preferred. Cutting edges with angles within these limits have proven to be useful for effective chipping.

BRIEF DESCRIPTION OF THE DRAWINGS

In the drawings preferred embodiments of the present invention are shown schematically, wherein.

DETAILED DESCRIPTION OF THE PREFERRED EMBODIMENTS

Figure 1:
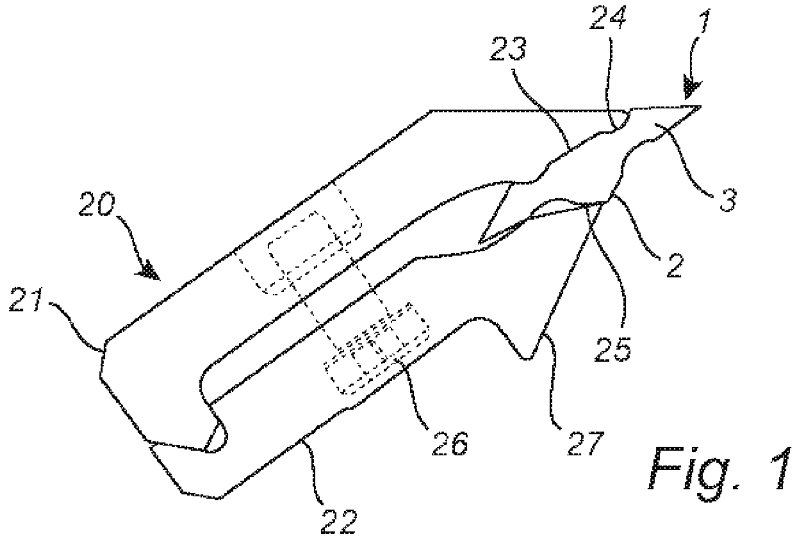
FIG. 1 is a cross-sectional view of a wood chipper knife according to a first embodiment of the invention mounted in a knife holder.

In the drawings and the description, the same references are used for all three embodiments of the wood chipper knife 1, as the embodiments differ only in certain dimensional aspects. Further, as far as directional indications are used in the description and the claims, such as top and bottom, these refer to the drawings and can therefore differ from reality. Finally, as machinery for wood chipping is well-known, only the wood chipper knife embodiments and a knife holder 20 for these are described and shown.

A wood chipper knife 1 according to the first embodiment is shown in FIG. 1 mounted in a knife holder 20. The knife holder 20 is, just like the wood chipper knife 1 itself, shown in a cross-sectional view. It extends into the drawing plane along the whole length of the wood chipper knife 1, which in reality means for at least some tenth of a meter.

Figure 2:
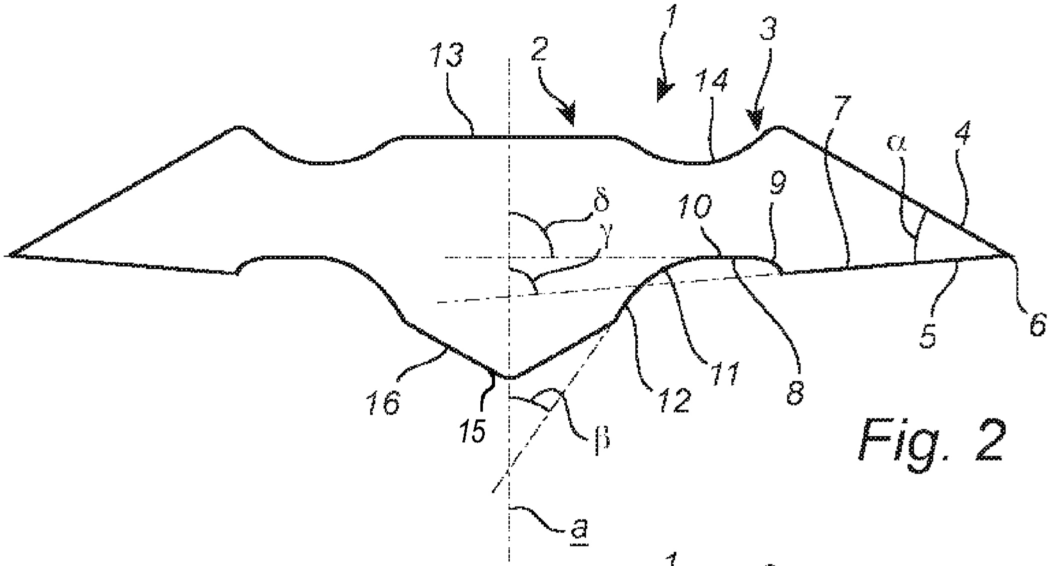
FIG. 2 is a cross-sectional view of the wood chipper knife of FIG. 1.
Figure 3:
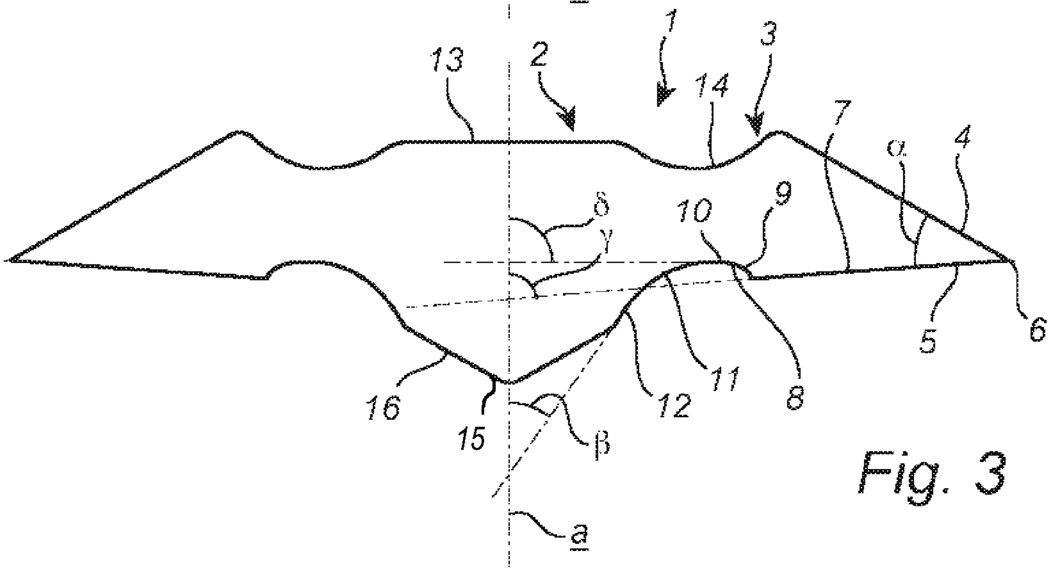
FIG. 3 is a cross-sectional view of a wood chipper knife according to a second embodiment of the invention.

The knife holder 20 comprises a base 21 on top and a clamp 22 underneath. Both are held together by means of a bolt 26, which renders it possible to securely clamp a wood chipper knife 1 in between. In order to fit in the knife holder 20, the wood chipper knife 1 comprises a central knife body 2, from which cutters 3 extend mirror symmetrically on both sides of a vertical axis a (or axis or plane of symmetry) illustrated in FIGS. 2 and 3. While in use, the wood chipper knife 1 can be positioned in multiple orientations depending on the orientation of the knife holder 20. For purposes of this discussion, the axis or plane of symmetry will coincide with the direction of gravity and be referred to as the vertical direction. On top the knife body 2 is a central, all flat portion 13, which fits a corresponding flat portion 23 of the knife holder base 21, and to the sides of it, concave grooves 14, which fit corresponding convex crests 24 of the knife holder base 21. Below the knife body 2 is a centered, downwardly protruding apex 15, having inclined sides 16, of which one at a time, depending on how the wood chipper knife 1 is rotated, fits a corresponding flat support 25 of the knife holder clamp 22.

Figure 4:
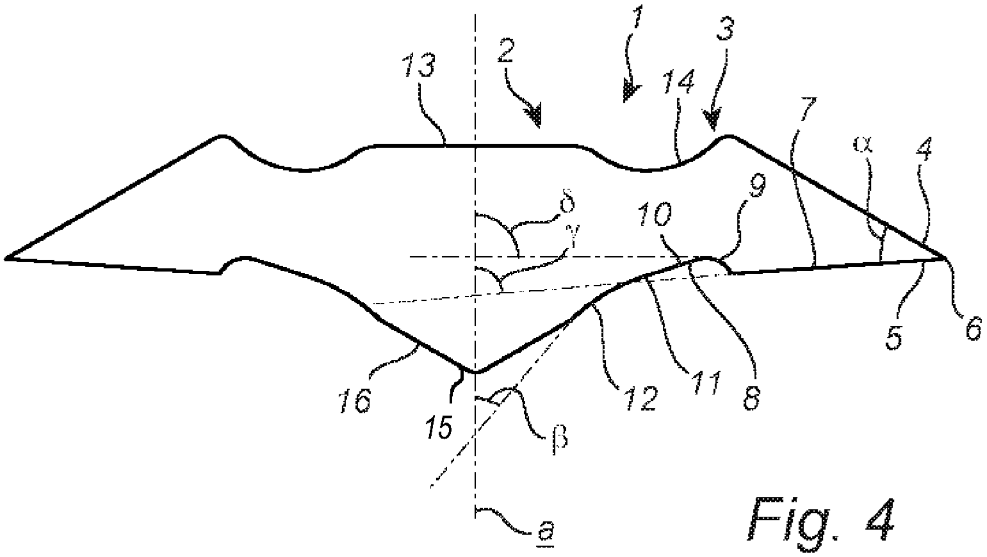
FIG. 4 is a cross-sectional view of a wood chipper knife according to a third embodiment of the invention.

So far, the wood chipper knife 1 described above corresponds to previous wood chipper knives provided by the applicant. However, in order to cope especially with wood that has a tendency to resist proper chipping due to wood fibers, which are difficult to break apart, the wood chipper knife 1 according to the present invention comprises cutters 3 shaped differently than before, wherein the three embodiments shown in detail in FIGS. 2 to 4 comprise the same main features and differ only dimensionally. Hence, below the three embodiments are described in common and differences pointed out only when necessary.

According to the invention, each cutter 3 (there is one on each side of the wood chipper knife 1) comprises a top cutting edge portion 4 and a bottom cutting edge portion 5. These intersect at an acute angle $\alpha$ of about 35° to form a cutting edge 6. The bottom cutting edge portion 5 comprises a planar wood attacking portion 7, which begins at the cutting edge 6 and towards the knife body 2 is followed by a recess 8. The wood attacking portion 7 is preferably inclined in relation to said vertical axis a at an angle $\gamma$ of preferably about 86° or at least within a range of 83° to 89°. From the cutting edge 6 to the recess 8, the planar wood attacking portion 7 has a width of about 7.5 mm according to the first and third embodiments and of about 8.5 mm according to the second embodiment. However, widths within a range of 5-10 mm have proven to fulfil the needs at hand, that is, to put cut wood chips under pressure and to guide them towards the knife body 2.

The recess that follows the planar wood attacking portion 7 is a pressure release recess 8, which, from the planar wood attacking portion 7, abruptly falls (or, as shown in the drawing, rises) to a bottom 10 of the pressure release recess 8. In this context, pressure release means that cut wood chips, which propagate along the planar wood attacking portion 7 and are under pressure therefrom, due to a sudden hollow when the pressure release recess 8 is reached, are subjected to a sudden substantial release of pressure, which helps to separate wood chips from each other and thus to free them from each other.

In the first and second embodiments shown, the pressure release recess 8 has a depth of about 1 mm and in the third embodiment a depth of about 0.55 mm. However, depths within a range of 0.3-2 mm are within the scope of the present invention. The bottom 10 of the pressure release recess 8 is planar and does, in relation to said vertical axis a form an angle $\delta$ of between 72° (third embodiment) to 90° (first embodiment). The width of the pressure release recess 8 from the wood attacking portion 7 to the knife body 2 amounts for the first embodiment to about 5.0 mm, for the second embodiment to about 4.1 mm, and for the third embodiment to about 3 mm. However, widths within a range of 2.8-8 mm are possible within the scope of the present invention.

Further, in all three embodiments the pressure release recess 8 comprises a first transition portion 9, which, from the bottom 10 of the pressure release recess 8, rises towards the wood attacking portion 7 along a concave curve. This curve helps to pick up and guide wood chips along the bottom 10 of the pressure release recess 8, which is done best with a curvature radius of about 0.8 mm (first and second embodiments) or 0.5 mm (third embodiment). However, radii within a range of 0.1-1.5 mm have proven to be possible. As discussed above, the curve of the first transition portion 9 defines an abrupt turn from the wood attacking portion 7. A curvature radius within the range of 0.1-1.5 mm would be considered to define an abrupt turn. As also discussed above, the first transition portion 9 can, towards the wood attacking portion 7, tangentially transform into a straight portion. That is, the first transition portion 9 can include a straight portion adjacent the wood attacking portion 7, and that straight portion transitions into a tangent of the concave curve. A first transition portion 9 that includes a straight portion that is adjacent the wood attacking portion 7 and that transitions into a tangent of the concave curve would be considered to define an abrupt turn.

At the opposite end of the pressure release recess 8, in all three embodiments, there is a second transition portion 11, which from the bottom 10 of the pressure release recess 8 rises towards the knife body 2 along a concave curve. This curve guides wood chips from the bottom 10 of the pressure release recess 8 onto an inclined chip guiding portion 12 described in greater detail below. The radius of the curvature of the second transition portion 11 is preferably of about 0.8 mm (first and second embodiments) or 4 mm (third embodiment), but can, within the scope of the present invention, range from 0.5 to 5 mm.

The chip guiding portion 12 forms part of the knife body 2. It follows a straight line, which is inclined from the pressure release recess 8 towards the knife body 2 at an angle $\beta$ in relation to said vertical axis a of preferably about 35° (first and second embodiments) or 47° (third embodiment). However, angles within a range of 25° to 50° are possible, especially if they make it possible for the second transition portion 11 to tangentially transform into the chip guiding portion 12 of the knife body 2, as this is advantageous for guiding chips in an orderly way without a tendency to tumble.

The inclined chip guiding portion 12 is finally followed by an inclined side 16 of the downwardly protruding apex 15 of the knife body 2. The inclination of the inclined side 16 is, as shown, preferably less steep than the corresponding chip guiding portion 12. The knife holder clamp 22 does preferably, as shown in FIG. 1, also comprise an inclined side 27 with an inclination corresponding to the corresponding inclined side 16 of the knife body 2. By this, it is rendered possible to keep the knife holder clamp 22 of the knife holder 20 out of the way from wood chips guided by inclined side 16 of the knife body 2 and thus to prolong the life of the knife holder 20.

A skilled person realizes that the above embodiments can be altered in various ways within the scope of the appendant claims as long as the most vital features of the invention, namely the wood attacking portion 7, the pressure release recess 8 and the chip guiding portion 12, are shaped and sized as indicated.

The invention claimed is:

1. A wood chipper knife, comprising:
- a knife body having a chip guiding portion; and
- at least one cutter side, which comprises a top cutting edge portion and a bottom cutting edge portion that intersect at an acute angle (a) to form a cutting edge,
- wherein the bottom cutting edge portion comprises a planar wood attacking portion, which begins at the cutting edge and towards the knife body is followed by a recess,
- the recess includes a first transition portion, a bottom, and a second transition portion,
- the first transition portion is contoured to abruptly turn from the wood attacking portion to the bottom of the recess,
- at least a portion of the bottom of the recess is planar,
- the second transition portion is contoured to curve from the bottom of the recess to the chip guiding portion, and
- the chip guiding portion is contoured so as to turn from the second transition portion of the recess towards the knife body.

2. The wood chipper knife according to claim 1, wherein the bottom of the recess is at a depth of at least 0.3 mm from the wood attacking portion.

3. The wood chipper knife according to claim 1, wherein the bottom of the recess is at a depth of 0.5-2 mm.

4. The wood chipper knife according to claim 1, wherein a dimension of the recess from the wood attacking portion to the knife body is 2.8-8 mm.

5. The wood chipper knife according to claim 1, wherein the first transition portion, from the wood attacking portion, turns towards the bottom of the recess along a concave curve with a radius of curvature of 0.1-1.5 mm.

6. The wood chipper knife according to claim 5, wherein the radius of curvature is 0.5-1.2 mm.

7. The wood chipper knife according to claim 5, wherein the radius of curvature is 0.6-1.0 mm.

8. The wood chipper knife according to claim 5, wherein the radius of curvature is 0.7-1.1 mm.

9. The wood chipper knife according to claim 5, wherein the radius of curvature is about 0.8 mm.

10. The wood chipper knife according to claim 5, wherein the first transition portion includes a straight portion that is adjacent the wood attacking portion and that tangentially transforms into the concave curve.

11. The wood chipper knife according to claim 5, wherein the second transition portion, from the bottom of the recess turns towards the knife body along a concave curve with a radius of 0.4-7 mm.

12. The wood chipper knife according to claim 11, wherein the second transition portion tangentially transforms into the chip guiding portion of the knife body.

13. The wood chipper knife according to claim 1, wherein the chip guiding portion is inclined towards the knife body at an angle (β) of 10° to 50° in relation to a vertical axis of the knife body.

14. The wood chipper knife according to claim 1, wherein the planar wood attacking portion from the cutting edge to the recess has a width of 5-10 mm.

15. The wood chipper knife according to claim 1, wherein the planar wood attacking portion in relation to a vertical axis of the knife body forms an angle (γ) of 83° to 89°.

16. The wood chipper knife according to claim 1, wherein the bottom of the recess, in relation to a vertical axis of the knife body forms an angle (δ) of 70° to 93°.

17. The wood chipper knife according to claim 1, wherein the acute angle (α) of the cutting edge is 30° to 40°.

18. A wood chipper knife, comprising:

a knife body having a chip guiding portion; and at least one cutter side, which comprises a top cutting edge portion and a bottom cutting edge portion that intersect at an acute angle (a) to form a cutting edge, wherein the bottom cutting edge portion comprises a planar wood attacking portion, which begins at the cutting edge and towards the knife body is followed by a recess, and the recess includes a straight portion adjacent to the wood attacking portion and a concave curve portion between the straight portion and a bottom of the recess.

19. The wood chipper knife according to claim 18, wherein a radius of curvature of the concave curve portion is 0.1-1.5 mm.

20. A wood chipper knife, comprising:

a knife body having a chip guiding portion; and at least one cutter side, which comprises a top cutting edge portion and a bottom cutting edge portion that intersect at an acute angle (α) to form a cutting edge, wherein the bottom cutting edge portion comprises a planar wood attacking portion, which begins at the cutting edge and towards the knife body is followed by a recess, the recess includes a first transition portion, a bottom, and a second transition portion, and the first transition portion of the recess includes a concave curve portion between the wood attacking portion and the bottom of the recess, a radius of curvature of the concave curve portion being 0.1-1.5 mm.

* * * * *